US012381375B1

(12) United States Patent
Ma et al.

(10) Patent No.: US 12,381,375 B1
(45) Date of Patent: Aug. 5, 2025

(54) SPARK PLUG ELECTRODE HAVING RUTHENIUM-BASED MATERIAL

(71) Applicant: Federal-Mogul Ignition LLC, Northville, MI (US)

(72) Inventors: Shuwei Ma, Ann Arbor, MI (US); Nicholas Ritsema, Brighton, MI (US)

(73) Assignee: FEDERAL-MOGUL IGNITION LLC, Northville, MI (US)

( * ) Notice: Subject to any disclaimer, the term of this patent is extended or adjusted under 35 U.S.C. 154(b) by 0 days.

(21) Appl. No.: 18/794,380

(22) Filed: Aug. 5, 2024

(51) Int. Cl.
*H01T 13/39* (2006.01)

(52) U.S. Cl.
CPC .................................... *H01T 13/39* (2013.01)

(58) Field of Classification Search
CPC ...................................................... H01T 13/39
See application file for complete search history.

(56) References Cited

U.S. PATENT DOCUMENTS

| | | | |
|---|---|---|---|
| 8,471,451 | B2 | 6/2013 | Ma |
| 8,575,830 | B2 | 11/2013 | Ma |
| 8,760,044 | B2 | 6/2014 | Ma |
| 8,766,519 | B2 | 7/2014 | Ma |
| 8,890,399 | B2 | 11/2014 | Ma |
| 8,979,606 | B2 | 3/2015 | Ma |
| 9,004,969 | B2 | 4/2015 | Ma |
| 10,044,172 | B2 | 8/2018 | Ma |

FOREIGN PATENT DOCUMENTS

| | | | |
|---|---|---|---|
| DE | 102013007316 | A1 | 10/2013 |
| DE | 102013106564 | A1 | 1/2014 |
| DE | 112012000947 | B4 | 3/2018 |
| DE | 112012004420 | B4 | 3/2018 |
| DE | 112012000411 | B4 | 4/2018 |
| DE | 112012000600 | B4 | 12/2018 |
| DE | 112012002699 | B4 | 12/2018 |
| DE | 112013002619 | B4 | 12/2018 |

*Primary Examiner* — Elmito Breval
(74) *Attorney, Agent, or Firm* — Reising Ethington PC

(57) ABSTRACT

A spark plug electrode made from a ruthenium-based material that includes one or more of the following characteristics: an equiaxed grain structure, a grain structure with an average grain size that is less than or equal to 50 μm, a grain structure with an average porosity that is less than or equal to 2%, and/or a grain structure with an average non-homogeneity ratio that is less than or equal to 6%. In one example, the ruthenium-based material is a binary alloy that includes rhodium from 1 wt % to 15 wt %, inclusive, and the balance ruthenium. In a different example, the ruthenium-based material is a ternary alloy that includes rhodium from 1 wt % to 15 wt %, inclusive, rhenium from 0.5 wt % to 5 wt %, inclusive, and the balance ruthenium. A powder metallurgy method is also provided for manufacturing the spark plug electrode.

17 Claims, 4 Drawing Sheets

SPARK PLUG ELECTRODE HAVING RUTHENIUM-BASED MATERIAL

TECHNICAL FIELD

This invention generally relates to spark plugs and other ignition devices for internal combustion engines and, in particular, to spark plug electrodes.

BACKGROUND

Spark plugs can be used to initiate combustion in internal combustion engines. Spark plugs typically ignite a gas, such as an air/fuel mixture, in an engine cylinder or combustion chamber by producing a spark across a spark gap defined between two or more electrodes. Ignition of the gas by the spark causes a combustion reaction in the engine cylinder that is responsible for the power stroke of the engine. The high temperatures, high electrical voltages, rapid repetition of combustion reactions, and the presence of corrosive materials in the combustion gases can create a harsh environment in which the spark plug must function. This harsh environment can contribute to erosion and corrosion of the electrodes that can negatively affect the performance and durability of the spark plug over time, potentially leading to a misfire or some other undesirable condition.

To reduce erosion and corrosion of the spark plug electrodes, various types of precious metals and their alloys have been used. These materials, however, can be costly. Thus, spark plug manufacturers oftentimes attempt to minimize the amount of precious metals used with an electrode by using such materials only at firing tips of the electrodes where a spark jumps across a spark gap. Firing tips made from platinum and iridium alloys, which have relatively good ductility and can be manufactured using traditional techniques involving drawing and rolling, have been used extensively in the industry but are becoming increasingly expensive and economically inviable to use with certain applications.

A less expensive precious metal alternative is ruthenium. However, ruthenium alloys have relatively high brittleness which makes them difficult to manufacture according to traditional techniques. Hot cracking and inter-granular cracking are just some of the undesirable characteristics that can be exhibited by traditional ruthenium-based firing tips when such tips are welded or otherwise attached to a spark plug electrode. An example of a ruthenium-based firing tip 510 attached to a nickel-based electrode 512 with a laser weld 514 is shown in FIG. 11. A number of inter-granular cracks and/or hot cracks 520 have formed in the firing tip 510, particularly near a junction with the laser weld 514. Skilled artisans will appreciate that cracks such as these are undesirable and, in certain cases, can even lead to the firing tip 510 being dislodged from the electrode 512.

It is, therefore, desirable to provide a spark plug electrode made from a ruthenium-based material that has robust erosion- and corrosion-resistant characteristics, as well as improved resistance to inter-granular cracks and/or hot cracks.

SUMMARY

In accordance with a first embodiment, there is provided a spark plug electrode, comprising: a ruthenium-based material having ruthenium and rhodium, ruthenium is the single largest constituent on a weight % basis, wherein the ruthenium-based material has an equiaxed grain structure with an average grain size that is less than or equal to 50 μm and an average porosity that is less than or equal to 2%.

In accordance with various embodiments, the spark plug electrode of the first embodiment may have any one or more of the following features, either singly or in any technically feasible combination:

- rhodium is the second largest constituent of the ruthenium-based material on a wt % basis, after ruthenium, and is present in the ruthenium-based material from 0.1 wt % to 35 wt %, inclusive;
- the ruthenium-based material is a binary alloy that includes rhodium from 1 wt % to 15 wt %, inclusive, and the balance ruthenium;
- at least one of the following metals is the third largest constituent of the ruthenium-based material on a wt % basis, after ruthenium and rhodium: platinum, palladium, iridium, gold, silver, rhenium, tungsten, tantalum, molybdenum or niobium;
- the ruthenium-based material is a ternary alloy that includes rhodium from 1 wt % to 15 wt %, inclusive, rhenium from 0.5 wt % to 5 wt %, inclusive, and the balance ruthenium;
- the ruthenium-based material has an average grain size that is from 5 μm to 40 μm, inclusive;
- the ruthenium-based material has an average porosity that is less than or equal to 1.5%;
- the ruthenium-based material has a grain structure with an average non-homogeneity ratio that is less than or equal to 6% in terms of the largest solute in the ruthenium-based material on a wt % basis;
- the largest solute on a wt % basis is rhodium; and/or
- the spark plug electrode is manufactured using a powder metallurgy method that includes sintering a powder mixture to directly form the spark plug electrode into its near net shape.

In accordance with a second embodiment, there is provided a spark plug electrode, comprising: a ruthenium-based material having ruthenium and rhodium, ruthenium is the single largest constituent on a weight % basis, wherein the ruthenium-based material has an equiaxed grain structure with an average grain size that is less than or equal to 50 μm and an average non-homogeneity ratio that is less than or equal to 6% in terms of the largest solute in the ruthenium-based material on a wt % basis.

In accordance with various embodiments, the spark plug electrode of the second embodiment may have any one or more of the following features, either singly or in any technically feasible combination:

- rhodium is the second largest constituent of the ruthenium-based material on a wt % basis, after ruthenium, and is present in the ruthenium-based material from 0.1 wt % to 35 wt %, inclusive;
- the ruthenium-based material is a binary alloy that includes rhodium from 1 wt % to 15 wt %, inclusive, and the balance ruthenium;
- at least one of the following metals is the third largest constituent of the ruthenium-based material on a wt % basis, after ruthenium and rhodium: platinum, palladium, iridium, gold, silver, rhenium, tungsten, tantalum, molybdenum or niobium;
- the ruthenium-based material is a ternary alloy that includes rhodium from 1 wt % to 15 wt %, inclusive, rhenium from 0.5 wt % to 5 wt %, inclusive, and the balance ruthenium;
- the ruthenium-based material has an average grain size that is from 5 μm to 40 μm, inclusive;
- the largest solute on a wt % basis is rhodium;

the ruthenium-based material has an average porosity that is less than or equal to 2%; and/or the spark plug electrode is manufactured using a powder metallurgy method that includes sintering a powder mixture to directly form the spark plug electrode into its near net shape.

DRAWINGS

Preferred exemplary embodiments of the invention will hereinafter be described in conjunction with the appended drawings, wherein like designations denote like elements, and wherein.

Figure 10:
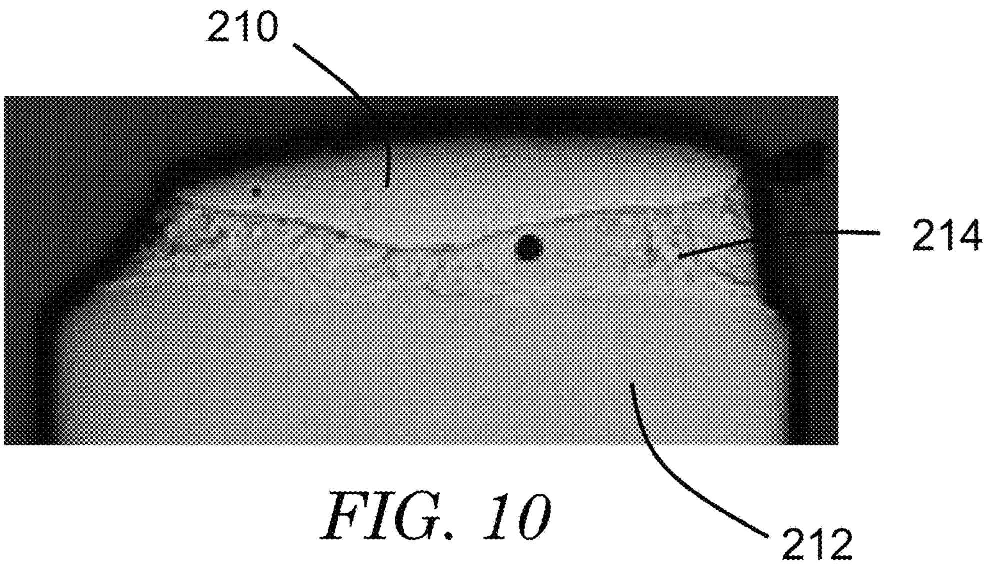
Figure 11:
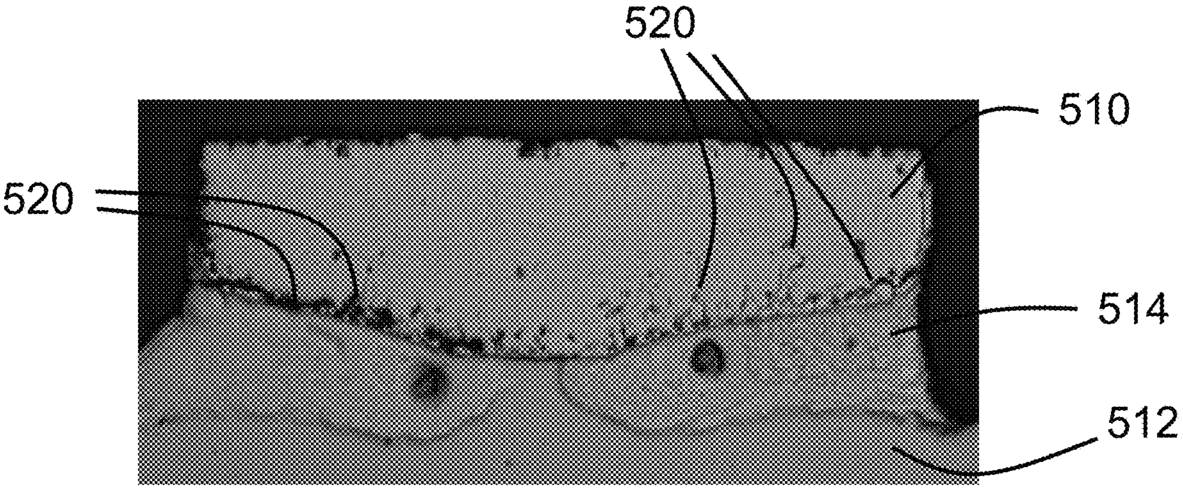

FIG. 10 is a magnified image of an exemplary spark plug electrode, in this case a ruthenium-based firing tip, that is attached to a center electrode with a laser weld; and FIG. 11 is a magnified image of a conventional spark plug electrode, in this case a ruthenium-based firing tip, that is attached to a center electrode with a laser weld and exhibits a number of inter-granular cracks and hot cracks.

DESCRIPTION

The spark plug electrode described herein is made from a ruthenium-based material and may be used in a wide array of spark plugs and other ignition devices including automotive spark plugs, industrial plugs, aviation igniters, glow plugs, or any other device that is used to ignite an air/fuel mixture in an engine. This includes, but is certainly not limited to, the exemplary spark plugs that are shown in the drawings and are described below.

Figure 1:
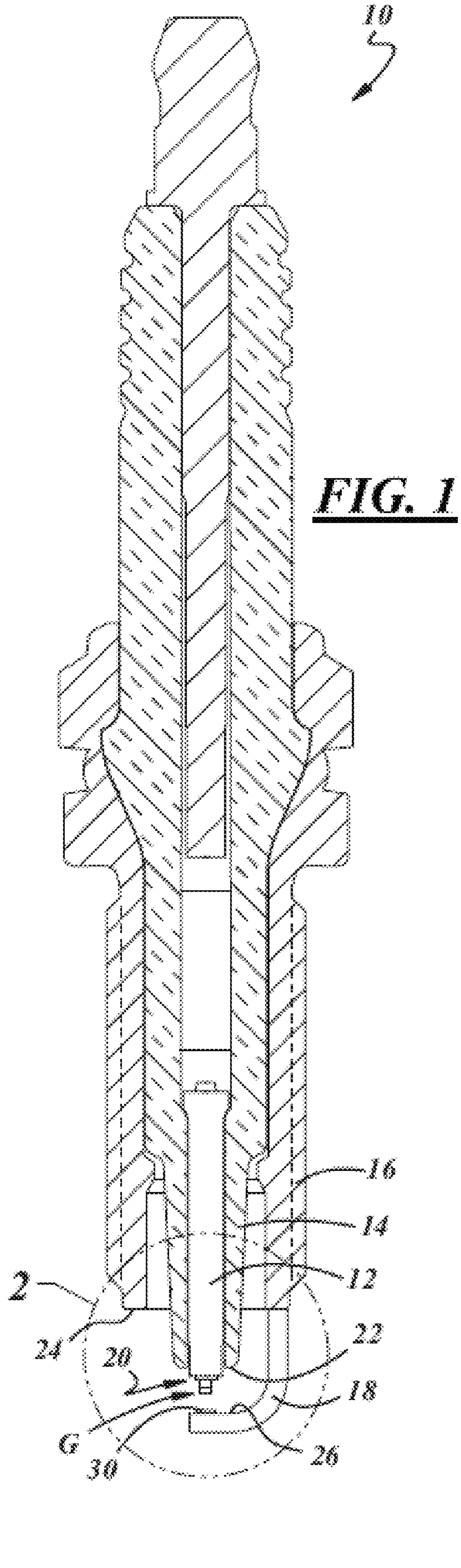
FIG. 1 is a cross-sectional view of an exemplary spark plug having one or more spark plug electrode(s) made from a ruthenium-based material.
Figure 2:
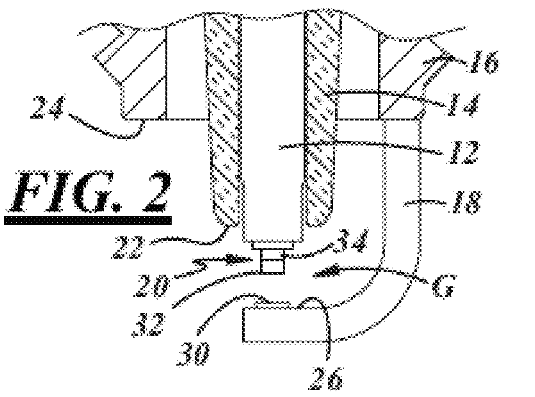
FIG. 2 is an enlarged cross-sectional view of a firing end of the spark plug from FIG. 1.

Referring to FIGS. 1 and 2, there is shown an exemplary spark plug 10 that includes a center electrode 12, an insulator 14, a metallic shell 16, and a ground electrode 18. The center electrode or base electrode member 12 is disposed within an axial bore of the insulator 14 and includes a firing tip 20 that protrudes beyond a free end 22 of the insulator 14. The firing tip 20 is a multi-piece rivet that includes a first component 32 made from an erosion- and/or corrosion-resistant material, like the ruthenium-based material described below, and a second component 34 made from an intermediary material like a nickel-based alloy. In this particular embodiment, the first component 32 has a cylindrical shape and the second component 34 has a stepped shape that includes a diametrically-enlarged head section and a diametrically-reduced stem section. The first and second components may be attached to one another via a laser weld, a resistance weld, or some other suitable welded or non-welded joint. Insulator 14 is disposed within an axial bore of the metallic shell 16 and is constructed from a material, such as a ceramic material, that is sufficient to electrically insulate the center electrode 12 from the metallic shell 16. The free end 22 of the insulator 14 may protrude beyond a free end 24 of the metallic shell 16, as shown, or it may be retracted within the metallic shell 16. The ground electrode 18 may be constructed according to the conventional J-shape configuration shown in the drawings or according to some other arrangement, and may be attached to the free end 24 of the metallic shell 16. According to this particular embodiment, the ground electrode 18 includes a side surface 26 that opposes the firing tip 20 of the center electrode and has a firing tip 30 attached thereto. The firing tip 30 is in the form of a flat pad and defines a spark gap G with the center electrode firing tip 20 such that they provide sparking surfaces for the emission and reception of electrons across the spark gap.

Figure 3:
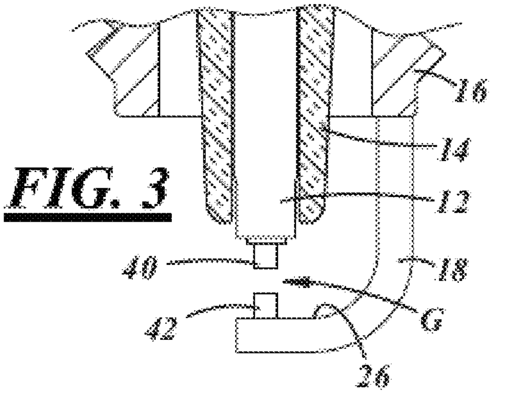
FIGS. 3-5 are enlarged cross-sectional views of firing ends of other exemplary spark plugs having one or more spark plug electrode(s) made from a ruthenium-based material.
Figure 4:
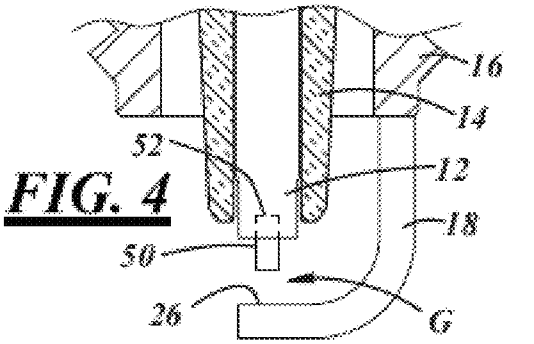
Figure 5:
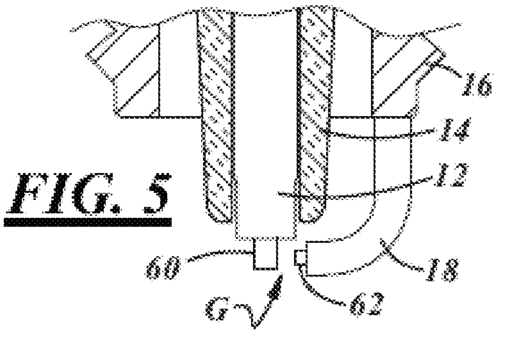

In this particular embodiment, the first component 32 of the center electrode firing tip 20 and/or the ground electrode firing tip 30 may be made from the ruthenium-based material described herein; however, these are not the only applications for that material. For instance, as shown in FIG. 3, the exemplary center electrode firing tip 40 and/or the ground electrode firing tip 42 may also be made from the ruthenium-based material. In this case, the center electrode firing tip 40 is a single-piece rivet and the ground electrode firing tip 42 is a cylindrical tip that extends away from a side surface 26 of the ground electrode by a considerable distance. The ruthenium-based material may also be used to form the exemplary center electrode firing tip 50 and/or the ground electrode 18 that is shown in FIG. 4. In this example, the center electrode firing tip 50 is a cylindrical component that is located in a recess or blind hole 52, which is formed in the axial end of the center electrode 12. The spark gap G is formed between a sparking surface of the center electrode firing tip 50 and a side surface 26 of the ground electrode 18, which also acts as a sparking surface. FIG. 5 shows yet another possible application for the ruthenium-based material, where a cylindrical firing tip 60 is attached to an axial end of the center electrode 12 and a cylindrical firing tip 62 is attached to an axial end of the ground electrode 18. The ground electrode firing tip 62 forms a spark gap G with a side surface of the center electrode firing tip 60, and is thus a somewhat different firing end configuration than the other exemplary spark plugs shown in the drawings.

It should be appreciated that the non-limiting examples described herein only represent some of the potential embodiments of a spark plug electrode, according to the present application. As used herein, the term “spark plug electrode,” whether pertaining to a center electrode, a ground electrode or some other electrode, broadly includes a base electrode by itself, a firing tip by itself, a component of a multi-piece firing tip by itself, some other firing end component by itself, or a combination thereof, to cite several possibilities. For instance, the following are non-limiting examples of potential spark plug electrodes according to the present application: center and/or ground electrodes, also referred to as base electrode members or base electrodes (e.g., center electrode 12, ground electrode 18); center and/or ground electrode firing tips, also referred to as firing tips (e.g., center electrode firing tips 20, 40, 50, 60 and ground electrode firing tips 30, 42, 62); components of multi-piece center and/or ground electrode firing tips (e.g., first and second components 32, 34 of center electrode firing tip 20); and firing end components of a prechamber spark plug, such as a protrusion or other sparking component of a prechamber cap (not shown). The aforementioned examples of potential spark plug electrodes may include spark plug electrodes that: are part of automotive and/or industrial plugs; are center and/or ground electrodes; form axial, radial, aerial and/or surface discharge spark gaps; are directly attached to a base electrode or are indirectly attached to a base electrode via one or more intermediate, intervening or stress-releasing layers; are in the shape of rivets, cylinders, bars, columns, wires, balls, mounds, cones, pads, blocks, disks, rings, sleeves and/or protrusions; are located within a recess, embedded into a base electrode or are attached to a surface of an electrode; and/or are located on a side surface, an axial end surface, an inner circumferential surface or an outer circumferential surface, such as a sleeve or other annular component. These are but a few of the possible embodiments of spark plug electrodes which have the ruthenium-based material described herein, others exist as well and are intended to be covered by the present application.

The spark plug electrode of the present application is made from a ruthenium-based material that includes one or more of the following of characteristics: an equiaxed grain structure, a grain structure with an average grain size that is less than or equal to 50 μm, a grain structure with an average porosity that is less than or equal to 2%, and/or a grain structure with an average non-homogeneity ratio that is less than or equal to 6%. The spark plug electrode described herein exhibits enhanced spark erosion resistance, durability and weldability and is ideal for use in various high-performance applications.

The term "ruthenium-based material," as used herein, broadly includes any alloy or other electrode material where ruthenium (Ru) is the single largest constituent on a weight % basis. This may include materials having greater than 50% ruthenium, as well as those having less than 50% ruthenium so long as the ruthenium is the single largest constituent. Skilled artisans will appreciate that ruthenium has a rather high melting temperature (2334° C.) compared to some precious metals, which can improve the erosion resistance of the electrode material. However, ruthenium can be more susceptible to oxidation than some precious metals, which can lower the corrosion resistance of the electrode material. Thus, the ruthenium-based material disclosed herein may include ruthenium plus one or more additional constituent(s) like precious metals, such as rhodium (Rh). Rhodium may be the second greatest or largest constituent of the ruthenium-based material on a wt % basis, after ruthenium, and may be present in the material from 0.1 wt % to 35 wt %, inclusive, even more preferably from 1 wt % to 15 wt %, inclusive, or even more preferably from 1 wt % to 10 wt %, inclusive. According to one set of examples, the ruthenium-based material may be a binary alloy that includes ruthenium and rhodium (e.g., Ru-(1-15)Rh), ruthenium and palladium (e.g., Ru-(1-15)Pd), ruthenium and platinum (e.g., Ru-(1-15)Pt), ruthenium and iridium (e.g., Ru-(1-15)Ir), ruthenium and gold (e.g., Ru-(1-15)Au), ruthenium and silver (e.g., Ru-(1-15)Ag), etc. A particularly suitable binary alloy is 95Ru-5Rh. It is also possible for the ruthenium-based material to include one or more additional metals, in addition to ruthenium and rhodium, such as: rhenium (Re), platinum (Pt), palladium (Pd), iridium (Ir), gold (Au), silver (Ag), tungsten (W), tantalum (Ta), molybdenum (Mo) and/or niobium (Nb). The combined amount of rhodium and the additional metal(s) together is preferably less than or equal to 35 wt %, inclusive, even more preferably less than or equal to 15 wt %, inclusive, and even more preferably less than or equal to 10 wt %, inclusive. According to some examples, the ruthenium-based material may be a ternary alloy that includes ruthenium, rhodium and one of rhenium (Re), platinum (Pt), palladium (Pd), gold (Au), silver (Ag) or tungsten (W) (e.g., Ru-(1-15)Rh-(0.5-5)Re, Ru-(1-15)Rh-(0.5-5)Ir, Ru-(1-15)Rh-(0.5-5)Pt or Ru-(1-15)Rh-(0.5-5)Pd). A particularly suitable ternary alloy is 94Ru-5Rh-1Re. In the examples above, the ruthenium-based material may be considered an alloy in the form of a solid solution, where the ruthenium constitutes the solvent and the one or more additional metal(s) constitute the solute (e.g., for 95Ru-5Rh, ruthenium is the solvent and rhodium is the solute; for 94Ru-5Rh-1Re, ruthenium is the solvent and rhodium and rhenium are the solutes, where rhodium is the largest solute on a wt % basis). One or more additional elements, compounds and/or other constituents may be added to the exemplary ruthenium-based materials described above, as the spark plug electrode described herein is not limited to those examples.

Figure 6:
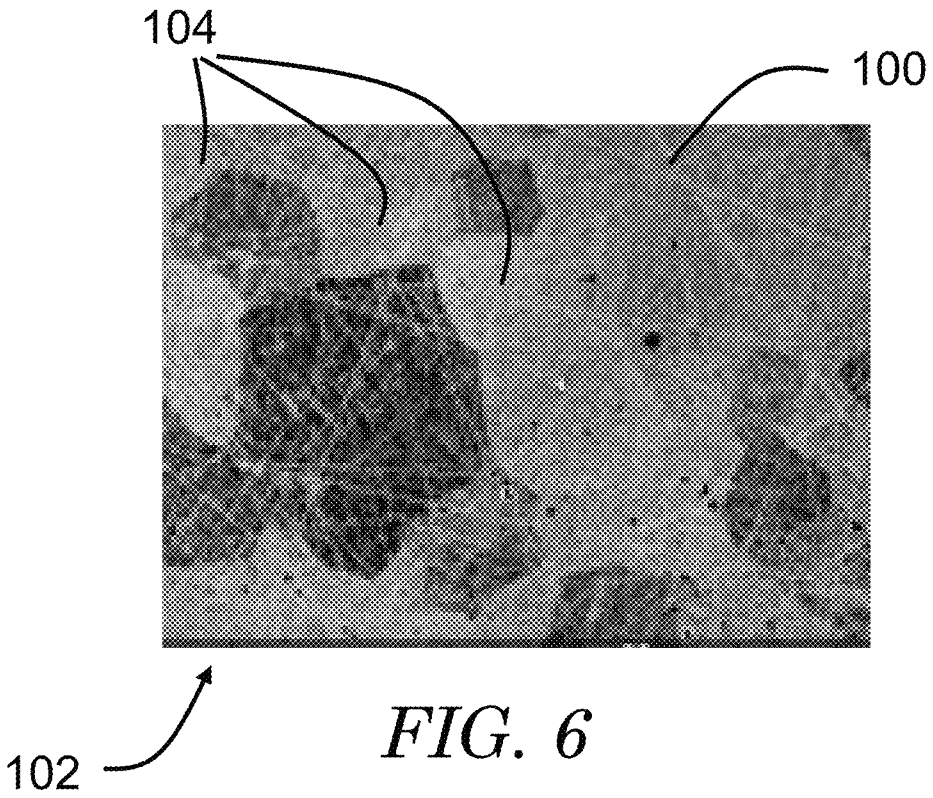
FIG. 6 is a magnified image of a spark plug electrode made of a ruthenium-based material, such as those shown in FIGS. 1-5, where the magnified image shows an example of an equiaxed grain structure.

The spark plug electrode of the present application, with its ruthenium-based material, preferably has an equiaxed grain structure. The term "equiaxed grain structure," as used herein, broadly includes a metallic grain structure that, when viewed in two dimensions (e.g., in a two dimensional magnified image, such as a backscattered electron (BSE) image or micrograph), has a majority of grains with approximately equal dimensions in all directions. An equiaxed grain structure is different than an elongated or columnar grain structure where a majority of grains have substantially greater dimensions in a certain direction (e.g., a longitudinal direction) than in other directions. With reference to FIG. 6, there is shown a BSE image of an exemplary spark plug electrode 100 made from a ruthenium-based material having an equiaxed grain structure 102. In this particular example, the ruthenium-based material is a Ru-5Rh-1Re sintered alloy and the BSE image has been magnified 1000× so that the shape of individual grains 104 can be better observed. As illustrated in FIG. 6, a majority of grains 104 in the ruthenium-based material have approximately equal dimensions in all directions; that is, they are not predominantly elongated or enlarged in a certain direction. This is in contrast to a spark plug electrode with a columnar grain structure where a majority of grains have a larger dimension in one direction than they do in another (i.e., they are elongated). The spark plug electrode sample in FIG. 6 has been mounted, ground and polished according to conventional metallurgical sample preparation techniques, followed by an electrolytic etching method that is applied to the sample to better reveal its grain structure.

Figure 7:
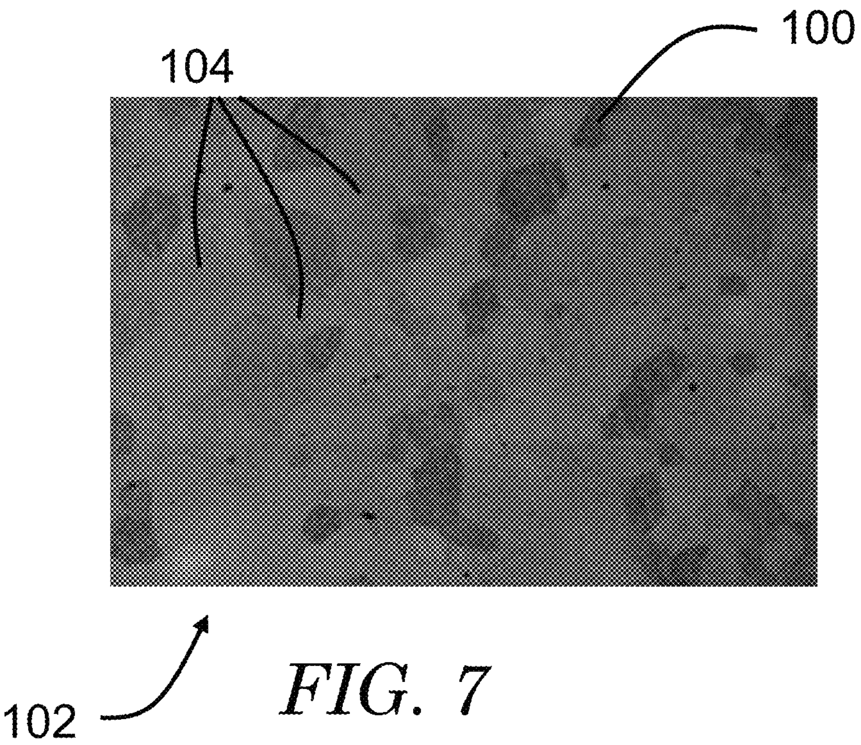
FIG. 7 is a magnified image of a spark plug electrode made of a ruthenium-based material, such as those shown in FIGS. 1-5, where the magnified image shows an example of a grain structure with an average grain size that is less than or equal to 50 μm.

The spark plug electrode also preferably has a grain structure with an average grain size that is less than or equal to 50 μm. The size of the grains can be determined by using a suitable measurement method, such as the method outlined in ASTM E112-13 (2021), where the average grain size is determined at one or more samples (e.g., 5 samples) at a sparking surface of the electrode, away from any welds (measuring the grain size at or near a laser weld, for example, can produce questionable results since the heat from the welding process sometimes impacts grain size). Providing a spark plug electrode made from a ruthenium-based material with a grain structure where the average grain size is less than or equal to 50 μm can be desirable for a number of reasons. For instance, testing has found that a ruthenium-based material with an average grain size less than or equal to 50 μm tends to exhibit fewer inter-granular cracks and hot cracks when the spark plug electrode is subjected to welding or other extreme heat, as described above in conjunction with FIG. 11. This, in turn, improves the weldability of the spark plug electrode. Testing has also shown that a ruthenium-based material with an average grain size less than or equal to 50 μm reduces the tendency of stress corrosion cracking during high-temperature environments, such as those typically experienced in an internal combustion engine. This improves the durability of the spark plug electrode. It is, therefore, preferable that the spark plug electrode of the present application be made from a ruthenium-based material having an average grain size that is less than or equal to 50 μm, even more preferably that is from 5 μm to 40 μm, inclusive, or even more preferably from 10 μm to 30 μm, inclusive. With reference to FIG. 7, there is shown an enlarged image of spark plug electrode 100 made from a ruthenium-based material having an equiaxed grain structure 102 where the material is a Ru-5Rh sintered alloy and the image has been magnified 300× so that the size of individual grains 104 can be better observed. The spark plug electrode sample in FIG. 7 has been mounted, ground and polished according to conventional metallurgical sample preparation techniques, followed by an electrolytic etching method that is applied to the sample to better reveal its grain structure.

Figure 8:
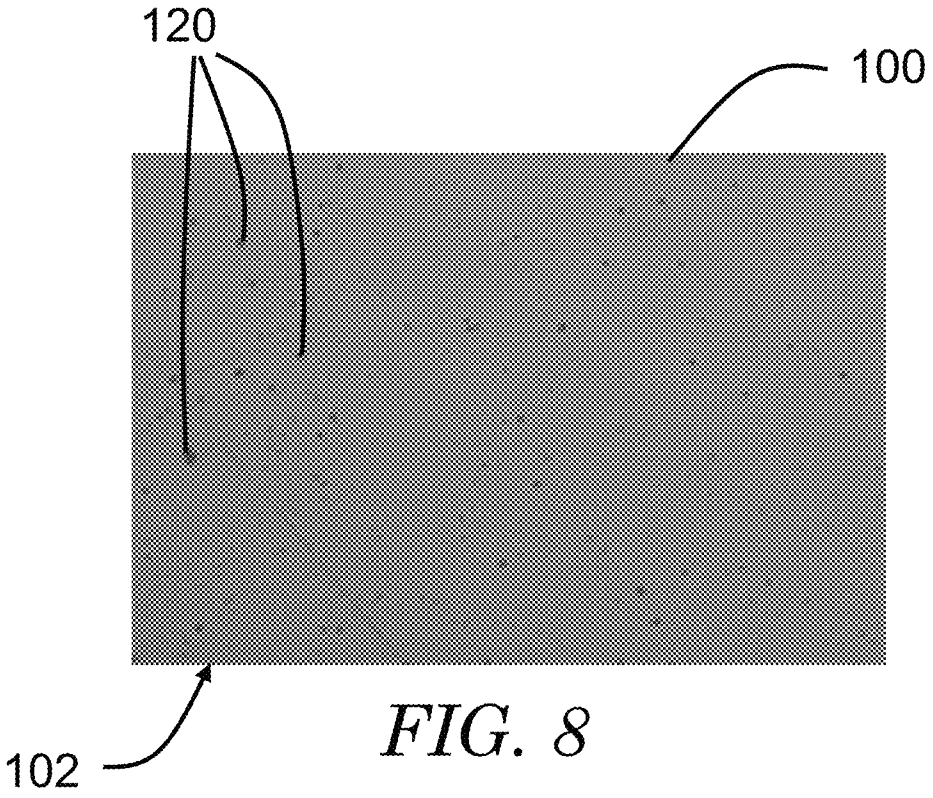
FIG. 8 is a magnified image of a spark plug electrode made of a ruthenium-based material, such as those shown in FIGS. 1-5, where the magnified image shows an example of a grain structure with an average porosity that is less than or equal to 2%.

It is also preferable for the spark plug electrode to have a grain structure with an average porosity that is less than or equal to 2%. The porosity of the material can be determined by using suitable image analysis method(s), such as the quantitative image analysis (QIA) method outlined in ASTM E562 combined with the automatic image analysis (AIA) method set forth in ASTM E1245, which generally determines a ratio of a total combined area of the pores divided by a total area of the material shown in the image field of view (can be expressed as a percentage). The average porosity is preferably determined at one or more samples (e.g., 5 samples) at a sparking surface of the electrode, away from any welds. Providing a spark plug electrode made from a ruthenium-based material with a grain structure where the average porosity is less than or equal to 2% can be desirable for a number of reasons. For instance, testing has found that a ruthenium-based material with an average porosity less than or equal to 2% tends to be less susceptible to a loss of mass that can otherwise occur in high temperature environments, such as those experienced in a combustion chamber. If the ruthenium-based material is too porous, oxygen atoms can attack porous sections of the sparking surface and weaken grain boundaries within the material which, in turn, may result in a loss of mass. Providing an electrode material with a ruthenium-based material having an average porosity less than or equal to 2% improves the durability of the spark plug electrode. It is, therefore, preferable that the spark plug electrode of the present application be made from a ruthenium-based material having an average porosity that is less than or equal to 2%, even more preferably that is less than or equal to 1.5%, or even more preferably that is from 0.15-1.2%, inclusive. With reference to FIG. 8, there is shown an enlarged image of spark plug electrode 100 made from a ruthenium-based material having an equiaxed grain structure 102 where the material is a Ru-5Rh sintered alloy and the image has been magnified 100× so that the relative quantity and size of pores 120 can be better observed. The pores or voids 120 are the spots shown in FIG. 8. The spark plug electrode sample in FIG. 8 has been mounted, ground and polished according to conventional metallurgical sample preparation techniques, without electrolytic etching, to better reveal its porosity.

Figure 9:
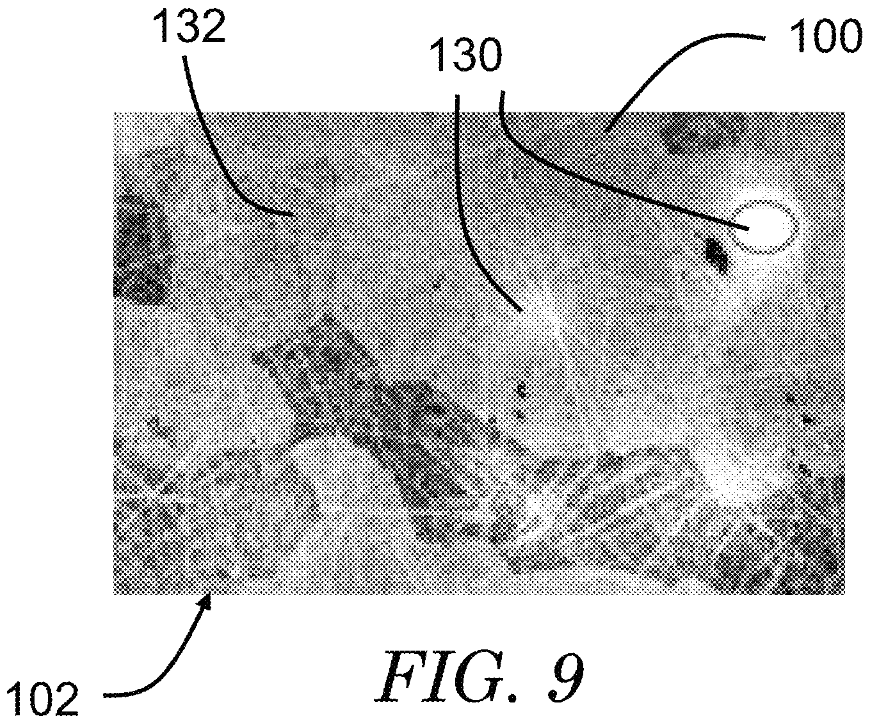
FIG. 9 is a magnified image of a spark plug electrode made of a ruthenium-based material, such as those shown in FIGS. 1-5, where the magnified image shows an example of a grain structure with an average non-homogeneity ratio that is less than or equal to 6% in terms of the largest solute in the ruthenium-based material on a wt % basis.

The spark plug electrode also preferably has a grain structure with an average non-homogeneity ratio that is less than or equal to 6% in terms of the largest solute in the ruthenium-based material on a wt % basis. Generally speaking, the non-homogeneity of the ruthenium-based material indicates how well the material or alloy has been sintered; the more complete the sintering process, the lower the non-homogeneity ratio (i.e., a low non-homogeneity ratio corresponds to a material that is rather homogeneous). The non-homogeneity ratio of the material can be determined by first identifying a solute-rich region, and then using a suitable measurement method to determine the non-homogeneity in the solute-rich region. One suitable measure method involves determining $(C_S\text{-}C_O)/C_O$, where $C_S$ represents the content of a solute (e.g., rhodium and/or rhenium) in a region or area that is rich in that particular metal (i.e., a solute-rich region) and $C_O$ represents the average content of that same solute in the ruthenium-based material in general. Turning now to FIG. 9, there is shown an enlarged image of spark plug electrode 100 made from a ruthenium-based material having an equiaxed grain structure 102 where the material is a Ru-5Rh-1Re sintered alloy and the image has been magnified 1000× so that the average non-homogeneity ratio can be better observed. In this image, which is a backscattered image (BSE), the bright regions or areas have a higher content of heavier metals, such as the solute rhodium, and correspond to solute-rich regions 130 (in most cases, ruthenium is the lightest metal in the ruthenium-based material). With a solute-rich region 130 identified (in this case a rhodium-rich region), the content of the solute $C_S$ in the solute-rich region 130 can be determined by using any suitable chemical composition analysis, such as by using a scanning electron microscope (SEM) or a scanning transmission electrode microscope (STEM) in conjunction with an energy dispersive spectroscopy (EDS) to determine the elemental content of the sample. The content of the solute $C_O$ in the material in general can then be determined from one or more non-solute-rich regions 132 and this may be carried out using the same chemical composition analysis. Once the content of the solute is determined in regions 130, 132, the formula above can be used to determine the non-homogeneity ratio, which is typically expressed as a percentage. In FIG. 9, the solutes are rhodium and rhenium and the solvent is ruthenium, but this is not required, as other solutes may be used instead. The average non-homogeneity ratio is preferably determined at one or more samples (e.g., 5 samples) at a sparking surface of the electrode, away from any welds. Providing a spark plug electrode made from a ruthenium-based material with a grain structure where the average non-homogeneity ratio is less than or equal to 6% can be desirable, as it can improve the durability and/or weldability of the ruthenium-based material. It is, therefore, preferable that the spark plug electrode of the present application be made from a ruthenium-based material having an average non-homogeneity ratio that is less than or equal to 6%, even more preferably that is less than or equal to 5%, or even more preferably that is less than or equal to 4%. Although it is preferable that all solutes in the material meet the average non-homogeneity ratio disclosed above, it is only required that the largest or primary solute in the ruthenium-based material (e.g., Rh in Ru-5Rh-1Re) have an average non-homogeneity ratio less than or equal to 6% in order to meet this requirement. The spark plug electrode sample in FIG. 9 has been mounted, ground and polished according to conventional metallurgical sample preparation techniques, and the sample has been subjected to electrolytic etching.

It should be appreciated that the above-described characteristics of the spark plug electrode are not necessarily independent of one another and may be correlated to one another. According to a first example, it is desirable to provide a spark plug electrode made from a ruthenium-based material having ruthenium and rhodium, where the ruthenium-based material has an equiaxed grain structure with an average grain size that is less than or equal to 50 μm and an average porosity that is less than or equal to 2%. In a second example, it is desirable to provide a spark plug electrode made from a ruthenium-based material having ruthenium and rhodium, where the ruthenium-based material has an equiaxed grain structure with an average grain size that is less than or equal to 50 μm and an average non-homogeneity ratio that is less than or equal to 6% in terms of the largest solute in the ruthenium-based material. According to a third example, it is desirable to provide a spark plug electrode made from a ruthenium-based material having ruthenium and rhodium, where the ruthenium-based material has an equiaxed grain structure with an average grain size that is less than or equal to 50 μm, an average porosity that is less than or equal to 2%, and an average non-homogeneity ratio that is less than or equal to 6% in terms of the largest solute in the ruthenium-based material. However, providing such spark plug electrodes can be challenging. To achieve a low porosity level, a higher sintering temperature and a longer sintering time are typically needed during manufacturing, but these process parameters oftentimes lead to increased average grain size. Testing has found that when the average grain size can be maintained at a level less than or equal to 50 μm in combination with the average porosity being kept at a level less than or equal to 2% and/or the average non-homogeneity ratio being kept to a level less than or equal to 6% in terms of the largest solute in the ruthenium-based material, the synergistic effect of these characteristics gives the ruthenium-based material enhanced spark erosion resistance, durability and weldability. A non-limiting example of a ruthenium-based firing tip 210 attached to a nickel-based center electrode 212 with a laser weld 214 is shown in FIG. 10. Skilled artisans will appreciate that there is a substantial reduction in inter-granular cracks and/or hot cracks in the firing tip 210, particularly in the area of laser weld 214, compared to the conventional firing tip 510 shown in FIG. 11. The spark plug electrode 210 has undergone engine testing and, in addition to a general absence of inter-granular cracks and/or hot cracks, the electrode exhibits desirable spark erosion resistance.

In terms of manufacturing, the following powder metallurgy method may be used to produce a spark plug electrode that is made of the ruthenium-based material and has the optimized grain structure described above. During an initial step, each of the constituents of the ruthenium-based material may be provided in powder form with a certain powder or particle size. In the example of the binary alloy 95Ru-5Rh, each of the constituents ruthenium and rhodium may be provided in powder form with a particle size of 0.1μ to 200μ, inclusive. Next, the constituent powders are blended together to form a powder mixture. This step may be performed with or without heat. The blended or mixed powder can then be pressed into the desired shape of the spark plug electrode (a so-called "green state") using a molding press, as is understood in the art. Afterwards, the pressed powder or green state component is sintered to form the spark plug electrode. This sintering step may be carried out according to any number of different embodiments, including: sintering in a vacuum or some type of protected environment; sintering at a temperature of about 0.5-0.8$T_{melt}$ of the base alloy (the "base alloy," as used herein, means the alloy formed from all of the constituents, such as 95Ru-5Rh or 94Ru-5Rh-1Re); sintering with or without pressure; and/or sintering such that a composition gradient is formed (e.g., a composition gradient from a grain boundary region to within the lattice or matrix) or is not formed; to cite a few possibilities. Sintering the powder mixture directly forms the spark plug electrode, as significant post-sintering process steps are generally not needed before the electrode is welded in place. This differs from traditional manufacturing processes where a sintering step is used to produce a stock piece, which is then subsequently drawn or otherwise metal worked into its final shape. In the present manufacturing process, the sintering step directly forms the spark plug electrode into its "near net shape," which unlike the traditional manufacturing processes mentioned above, results in the electrode being shaped as close as possible to its final shape. Of course, minor post-sintering process steps, such as pressing, polishing or other surface preparation steps may be used with the near net shape electrode before welding.

It should be appreciated that the spark plug electrode and/or ruthenium-based material of the present application is not limited to being manufactured according to the aforementioned powder metallurgy method. Other methods and techniques may be used instead. For instance, the initial step could be modified such that the constituents are pre-alloyed and formed into a powder using an atomization process before being mixed and/or sintered.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A spark plug electrode, comprising:

a ruthenium-based material having ruthenium, rhodium and rhenium, ruthenium is the single largest constituent on a weight % basis, wherein the ruthenium-based material has an equiaxed grain structure with an average grain size that is less than or equal to 50 μm, has an average porosity that is less than or equal to 2%, and is a ternary alloy that includes rhodium from 1 wt % to 15 wt %, inclusive, rhenium from 0.5 wt % to 5 wt %, inclusive, and the balance ruthenium.

2. The spark plug electrode of claim 1, wherein rhodium is the second largest constituent of the ruthenium-based material on a wt % basis, after ruthenium.

3. The spark plug electrode of claim 2, wherein rhenium is the third largest constituent of the ruthenium-based material on a wt % basis, after ruthenium and rhodium.

4. The spark plug electrode of claim 1, wherein the ruthenium-based material has an average grain size that is from 5 μm to 40 μm, inclusive.

5. The spark plug electrode of claim 1, wherein the ruthenium-based material has an average porosity that is less than or equal to 1.5%.

6. The spark plug electrode of claim 1, wherein the ruthenium-based material has a grain structure with an average non-homogeneity ratio that is less than or equal to 6% in terms of the largest solute in the ruthenium-based material on a wt % basis.

7. The spark plug electrode of claim 6, wherein the largest solute on a wt % basis is rhodium.

8. The spark plug electrode of claim 1, wherein the spark plug electrode is manufactured using a powder metallurgy method that includes sintering a powder mixture to directly form the spark plug electrode into its near net shape.

9. A spark plug electrode, comprising:

a ruthenium-based material having ruthenium and rhodium, ruthenium is the single largest constituent on a weight % basis, wherein the ruthenium-based material has an equiaxed grain structure with an average grain size that is less than or equal to 50 μm and an average non-homogeneity ratio that is less than or equal to 6% in terms of the largest solute in the ruthenium-based material on a wt % basis.

10. The spark plug electrode of claim 9, wherein rhodium is the second largest constituent of the ruthenium-based material on a wt % basis, after ruthenium, and is present in the ruthenium-based material from 0.1 wt % to 35 wt %, inclusive.

11. The spark plug electrode of claim 10, wherein the ruthenium-based material is a binary alloy that includes rhodium from 1 wt % to 15 wt %, inclusive, and the balance ruthenium.

12. The spark plug electrode of claim 10, wherein at least one of the following metals is the third largest constituent of the ruthenium-based material on a wt % basis, after ruthenium and rhodium: platinum, palladium, iridium, gold, silver, rhenium, tungsten, tantalum, molybdenum or niobium.

13. The spark plug electrode of claim 12, wherein the ruthenium-based material is a ternary alloy that includes rhodium from 1 wt % to 15 wt %, inclusive, rhenium from 0.5 wt % to 5 wt %, inclusive, and the balance ruthenium.

14. The spark plug electrode of claim 9, wherein the ruthenium-based material has an average grain size that is from 5 μm to 40 μm, inclusive.

15. The spark plug electrode of claim 9, wherein the largest solute on a wt % basis is rhodium.

16. The spark plug electrode of claim 9, wherein the ruthenium-based material has an average porosity that is less than or equal to 2%.

17. The spark plug electrode of claim 9, wherein the spark plug electrode is manufactured using a powder metallurgy method that includes sintering a powder mixture to directly form the spark plug electrode into its near net shape.

* * * * *